Dec. 28, 1965 E. P. G. WRIGHT 3,226,676

DATA HANDLING SYSTEM WITH MODIFICATION
OF DATA CONTROL PATTERNS

Filed Nov. 7, 1961

Inventor
ESMOND P. G. WRIGHT

By [signature]
Attorney

United States Patent Office 3,226,676 Patented Dec. 28, 1965

3,226,676
DATA HANDLING SYSTEM WITH MODIFICATION OF DATA CONTROL PATTERNS

Esmond Philip Goodwin Wright, London, England, assignor to International Standard Electric Corporation, New York, N.Y., a corporation of Delaware Filed Nov. 7, 1961, Ser. No. 150,740
Claims priority, application Great Britain, Nov. 15, 1960, 39,143/60
5 Claims. (Cl. 340—146.1)

Figures 1, 2:
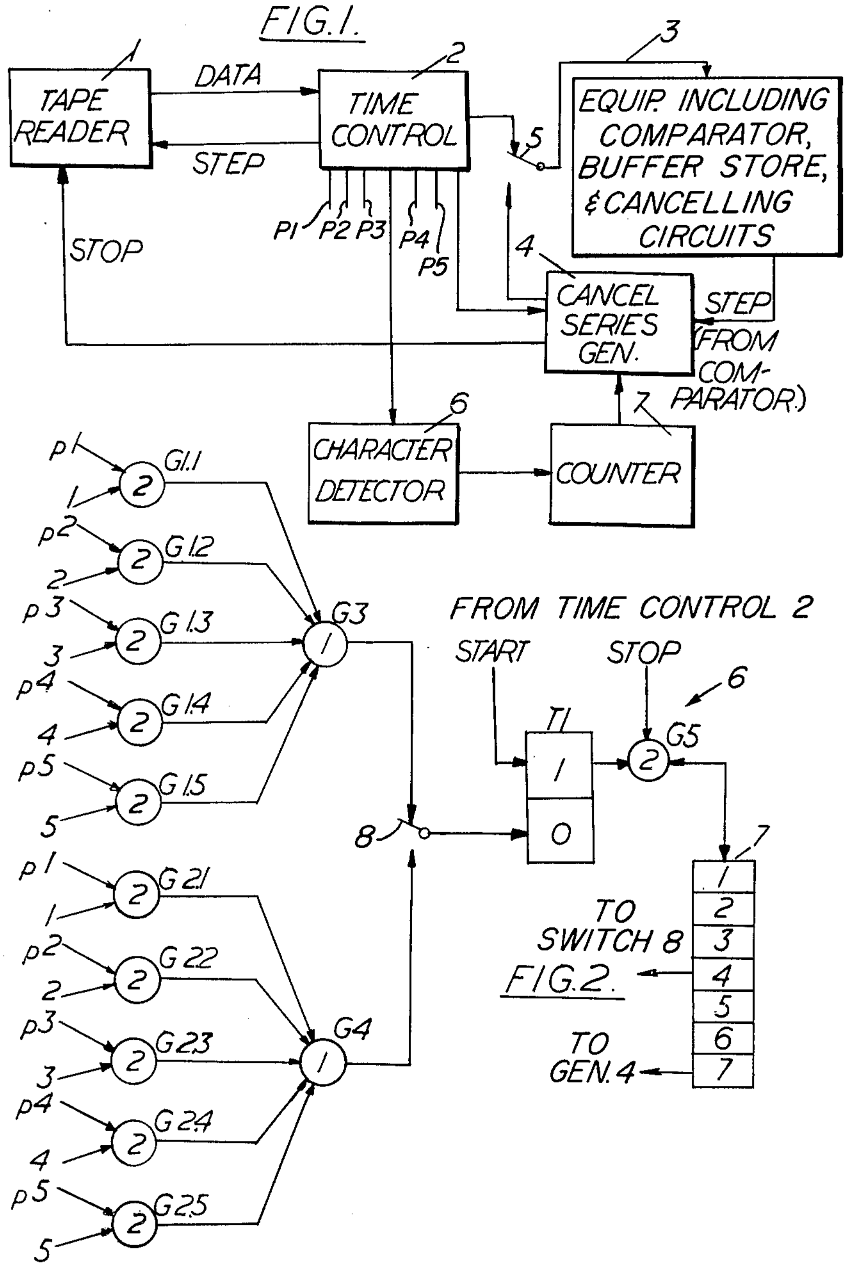

This invention relates to data transmission systems, and particularly to data transmission systems in which various predetermined patterns of data are used for switching or correction purposes.

In such systems the use of random characters in the text may well give rise to a sequence of characters which corresponds to one of the predetermined switching or correction patterns, and an unwanted operation results, together with a possible mutilation of the received text.

It is an object of the invention to allow the use of random characters in the text without unwanted results.

According to the invention there is provided a data handling system, such as data processing or data transmission systems in which certain predetermined patterns of data or characters are used to influence the conditions of processing or transmission, including sensing means for recognizing the presence of such predetermined patterns occurring at random in the text of a message for processing or transmission, and means responsive to said sensing means for modifying said predetermined patterns during processing or transmission so as to prevent or nullify the effect of unwanted influencing of the conditions of processing or transmission.

Two embodiments of the invention in preferred form will now be described with reference to the accompanying drawings, in which:

FIG. 1 is a block schematic diagram of a data transmitting station,

FIG. 2 gives functional details of the character detector and counter of FIG. 1.

It will be assumed that the data is transmitted by the well-known form of telegraph code in which each different character has a different combination of five "mark" or "space" elements.

The normal operation consists of applying stepping signals by a time control 2 to a tape reader 1 which causes new characters to be successively presented. These are retransmitted to line 3 each in serial form of five elements with the addition, in equipment not specifically shown, of at least one extra pulse for error detection purposes. For instance, the addition of two extra pulses to render the ratio of "mark" to "space" and/or "space" to "mark" constant as is known in the prior art is exemplified by U.S. Patents 2,518,405, 2,603,705, 2,703,361, 2,706,215, and 2,912,498. Also, if necessary start and stop elements may be added.

A comparator normally disposed in the receiving end equipment but which may be disposed of in the sending end equipment to monitor the characters being transmitted responds when an error occurs and applies for a retransmission to a cancel series generator 4. The comparator may be any of the error detection equipment known in the art capable of producing an error detected signal, such as disclosed in the above-cited patents. The error detected signal may be any predetermined pulse signal, such as a single pulse having a predetermined characteristic, or a predetermined code sequence, which may be detected to start the retransmission process.

Generator 4 switches itself upon receipt of the error detected signal via switch 5 to the outgoing line 3 and sends a series of characters to indicate to the receiving end that a certain predetermined number of characters is being retransmited. Thereafter by means not forming part of this invention, the requisite number of characters for retransmission are withdrawn from a buffer store and retransmitted. During this retransmission process a stop signal is applied by the cancel series generator 4 to the tape reader 1 to inhibit any stepping signals from the time control 2. Generator 4 may be a pattern movement register as described in U.S. Patent 2,649,502 containing the cancel signal characters. On receipt of a signal from the comparator, the register contents are sent serially to line 3 and also returned to the register. The timing for generator 4 is obtained from time control 2 to maintain synchronization. Generator 4 also will include a pulse source to apply the stop pulse to reader 1 upon receipt of the signal from the comparator.

In some systems, a character sequence of KKKKLLLL causes twelve consecutive characters to be cancelled, i.e., the above character sequence itself plus the four previous characters already received, and such characters are introduced into the text when an error is detected and a correction is being made.

Thus, in the system of FIG. 1 as so far described, the cancel series generator 4 responds to an error detected signal from the comparator to transmit the character sequence KKKKLLLL with the result that the receiving end cancels this sequence and the four received characters preceding this sequence, treating the next four received characters as the correction for the four cancelled characters preceding the character sequence KKKKLLLL.

The receiving end would therefore respond in a similar way if the sequence KKKKLLLL were to occur at random in the text. This would result in an unwanted operation involving the unwanted cancellation of twelve consecutive characters of the received text.

In accordance with the invention, a character detector 6 and a counter 7 are provided to recognize predetermined sequences of characters occuring in the text to be transmitted, as described hereinbelow in connection with FIG. 2, these sequences being the same as those normally used for switching or correction purposes, and therefore constituting unwanted combinations when appearing at random in the text.

If an unwanted combination appears (or if the first seven characters appear) the text transmission is interrupted in a known manner, such as described in the above-cited patents, by applying a stop signal from generator 4, in response to the output from counter 7, to reader 1, and the cancel signal is introduced. Correction is then applied as if the last "K" had been in error.

| | |
|---|---|
| Text to be transmitted | ABKKKKLLLLCD etc., |
| Text up to interruption | ABKKKKLLL |
| Cancel signal | KKKKLLLL |
| Correction | KLLL |
| Continuation | LCD etc. |

From the above it will be seen that the sending of the eight character cancel signal causes the receiving end to cancel this signal plus the four previous characters, i.e. KKKKLLLL+KLLL. The correction signal is KLLL and the result is that no mutilation of the received text results.

One possible form of the apparatus at the receiving end to carry out the cancelling of the twelve characters may include a pattern movement register, such as disclosed in U.S. Patent 2,649,502, having twelve stages through which all the received characters are passed serially, the latest received character entering stage one whereupon the eleven previously received characters are each moved one stage further into the register, the character occupying the twelfth stage being moved therefrom and coupled to further receiving end apparatus. Cooperating with this register is a well known arrangement to examine the first eight stages of the register including a device having the cancel signals preset therein and a circuit to produce an output signal when the characters in the first eight stages of the register are the same as the present cancel signal in the device. This output signal will then cause the complete register to be emptied without passing the stored signals to the further receiving end apparatus.

Referring to FIG. 2, character detector 6 is illustrated as including basically a trigger device T1 coupled to time control 2 to monitor the transmitted characters element by element. At the start of a character device T1 is triggered to its other stable state to provide a predetermined output, for instance, a positive output. Under control of element sampling or examining signals generated in control 2, samples of the character element are supplied to device T1, for instance at 30, 50, 70, 90, and 110 msec. from the start of the character. A second input to device T1 is provided by way of switch 8 from gate G3 having as inputs the output of five coincidence gates G1.1–G1.5. The output of gate G3 provides a sequence of signals corresponding to the elements of the character being sought ("K"), these reference signals being applied in sequence through gate G3 to device T1 simultaneously with the samples of the character elements being transmitted, or in other words, simultaneously with the character element samples being applied to the other input device T1. The reference character elements are provided by establishing on inputs 1 to 5 of gates G1.1–G1.5 the "mark" and "space" condition of the elements of the character being sought ("K") for instance, by applying appropriate + and − potentials to inputs 1–5. The reference character elements are then appropriately timed for application through gate G3 to device T1 by application of the sampling or examining pulse to inputs P1–P5 from control 2 corresponding to the sampling pulses transmitted character elements, namely, in the example herein, sampling pulses spaced 30, 50, 70, 90 and 110 msec. from the start of the character.

The triggering logic is so arranged in device T1 that as long as the reference elements and the sampled elements are the same device T1 will remain in its triggered condition. If, however, any of the five elements of the transmitted character do not agree, device T1 will be restored to its original condition.

If at the conclusion of the transmission of each character the trigger device T1 remains operated, the counter 7 is stepped via the output of coincidence gate G5 activated by a timing signal from control 2 indicating the end of the character. If the trigger is restored during the character, the counter is restored also.

After the counter has taken a certain number of steps (four in the present example), a second series of gates G2.1–G2.5 and G4, similar to gates G1.1–G1.5 and G3 but to provide a reference for another character combination ("L") may be substituted by activation of switch 8 in response to the activation of the fourth stage of counter 7 in order to detect a different character combination ("L") in the transmitted characters.

If the counter reaches some predetermined position, (the seventh stop in the present example) a signal is sent to the cancel series generator 4 which stops the general flow of data as already described. When the cancel series has been completed, the predetermined characters are repeated and the counter is restored when the normal retransmission recommences.

Thus the message is so split that initially all but the last character of the simulated cancel signal is transmitted, and subsequently all but the first character of the simulated cancel signal is transmitted. This requires the cancel signal combination to contain (N+2) characters, where N is the number of characters stored in the buffer store for repeated transmission upon detection of an error.

In practice, the value of N will have to be at least 4 and therefore the cancel signal would have to be of at least six characters, e.g., XXXYYY.

Alternatively, it is possible by checking the message during transmission to deliberately introduce an error into the transmitted message in such a way that a repetition is automatically incurred, causing any simulated cancel sequence within the message to be broken and prevent its recognition as a cancel signal at the receiving end.

When the check on the data message, as already described, indicates that all but the last character of a simulated cancel signal sequence has been transmitted, an error is deliberately introduced into the next character to be transmitted. However, the correct character information is fed into the buffer store for subsequent comparison with the returned signals.

Upon the error being detected the normal correction procedure is automatically performed, a true cancel signal is sent followed by a repetition of the characters held in the buffer store. Provided that the first character to be repeated is always the character in error then the simulated cancel signal sequence in the message is broken and will not be falsely recognised as a cancel at the receiving end.

| | |
|---|---|
| Cancel signal | XXYY |
| Message | CBXAXXYYPQRS |
| Actual transmission | CBXAXXY$\phi$PQR XXYY YPQRS |

The character underlined are eliminated when processing the received message. Character deliberately transmitted in error is shown in $\phi$ and is a predetermined markspace character to purposely cause the receiving end to detect an error, the deliberately introduced character having the same form, frequency and radix as the other characters in the text.

It will be apparent that in this way, the cancel signal could be made as short as only two characters. However, this would cause a great number of repeated transmission and considerable advantage is to be gained by using more characters. A four-character combination, e.g., XXYY, is preferred, in which the first and second characters are of one character combination, and the third and fourth characters of a second character combination.

It is to be understood that the foregoing description of specific examples of this invention is not to be considered as a limitation on its scope.

What I claim is:

1. A data handling system enabling the employment of predetermined patterns of characters normally used to initiate control functions in data handling in the text of a message for data handling comprising:
  - a source of message, said messages including as distinct portions thereof the message text and predetermined patterns of characters to initiate control functions;
  - sensing means for detecting said predetermined patterns occurring at random in said message text only; and
  - means coupled to said sensing means responsive to the detection of said predetermined patterns in said message text for modifying said detected predetermined patterns during data handling to prevent said detected predetermined patterns from initiating the control function they normally represent.

2. A system according to claim 1, wherein said modifying means upon the occurrence of said detected predetermined patterns causes said detected predetermined patterns to be broken up during data handling in such a manner as to be no longer recognizable as said predetermined patterns.

3. A system according to claim 2, wherein said sensing means detects all but the last character of said detected predetermined patterns.

4. A data handling system in which certain predetermined patterns of data are normally used to initiate control functions in data handling comprising:

sensing means for recognizing the presence of said predetermined patterns occurring at random in the text of a message for data handling; and means responsive to said sensing means for modifying said predetermined patterns during data handling to prevent said predetermined patterns from initiating the control functions they normally represent;

said sensing means detecting all but the last character of said predetermined pattern; and said modifying means including means responsive to said sensing means for transmitting a cancel signal and stopping normal data handling after the penultimate character of said predetermined pattern, means responsive to the receipt of said cancel signal for canceling all the received characters of said predetermined pattern except the first character, means for retransmitting the canceled characters of said pattern, and means for restarting normal data handling commencing with the last character of said predetermined pattern.

5. A data handling system in which certain predetermined patterns of data are normally used to initiate con trol functions in data handling comprising:

sensing means for recognizing the presence of said predetermined patterns occurring at random in the text of a message for data handling; and means responsive to said sensing means for modifying said predetermined patterns during data handling to prevent said predetermined patterns from initiating the control functions they normally represent;

said sensing means detecting all but the last character of said predetermined pattern; and said modifying means including means responsive to said sensing means for introducing a deliberate error into the next character to be transmitted after the penultimate character of said predetermined pattern, means for detecting said error, means responsive to the detection of said error for transmitting a cancel signal and stopping normal data handling, means responsive to the receipt of said cancel signal for canceling all previously received characters back to and including said next character, means for retransmitting the canceled characters with said next character being transmitted correctly, and means for restarting normal data handling.

References Cited by the Examiner

UNITED STATES PATENTS

| | | | |
|---|---|---|---|
| 2,653,996 | 9/1953 | Wright | 178—23 |
| 2,993,956 | 7/1961 | Steeneck | 340—146.1 X |
| 3,001,176 | 9/1961 | Ingham | 340—146.1 |

ROBERT G. BAILEY, *Primary Examiner.*

DARYL W. COOK, MALCOLM A. MORRISON, *Examiners.*